US012613680B2

(12) United States Patent
Wani et al.

(10) Patent No.: US 12,613,680 B2
(45) Date of Patent: Apr. 28, 2026

(54) CONTROLLING DATA SCHEMA FOR DATA ORIENTED ARCHITECTURE

(71) Applicant: Lemon Inc., Grand Cayman (KY)

(72) Inventors: Priyeshkumar Wani, Los Angeles, CA (US); Vybhav Achar Bhargav, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 128 days.

(21) Appl. No.: 18/456,674

(22) Filed: Aug. 28, 2023

(65) Prior Publication Data

US 2024/0004618 A1 Jan. 4, 2024

(51) Int. Cl.
*G06F 8/33* (2018.01)
*G06F 8/38* (2018.01)

(52) U.S. Cl.
CPC . *G06F 8/33* (2013.01); *G06F 8/38* (2013.01)

(58) Field of Classification Search
CPC ...................................................... G06F 8/437
See application file for complete search history.

(56) References Cited

U.S. PATENT DOCUMENTS

| | | | |
|---|---|---|---|
| 7,234,115 B1 | 6/2007 | Sprauve et al. | |
| 7,404,177 B1 | 7/2008 | Greenfield et al. | |
| 7,992,130 B2 * | 8/2011 | Bozza ..................... | G06F 9/449 |
| | | | 717/115 |
| 8,387,004 B2 * | 2/2013 | Beckman .................. | G06F 8/20 |
| | | | 717/109 |

| | | | |
|---|---|---|---|
| 8,595,213 B2 * | 11/2013 | Schaefer ................. | G06F 8/437 |
| | | | 707/713 |
| 9,652,207 B2 * | 5/2017 | Hoban ..................... | G06F 8/437 |
| 10,203,940 B2 * | 2/2019 | Hodaei .................... | G06F 8/437 |
| 10,603,583 B1 * | 3/2020 | Ferreyra ................. | H04L 67/34 |
| 10,698,667 B2 * | 6/2020 | Hodaei .................... | G06F 8/41 |
| 11,513,655 B2 * | 11/2022 | Narayanan ............. | G06N 20/00 |
| 11,740,875 B2 * | 8/2023 | Abdelaziz ................ | G06F 8/31 |
| | | | 717/114 |
| 11,947,934 B2 * | 4/2024 | Rahill-Marier ......... | G06F 8/433 |
| 12,023,591 B2 * | 7/2024 | Roth ....................... | A63F 13/80 |
| 2005/0172261 A1 * | 8/2005 | Yuknewicz ............... | G06F 8/38 |
| | | | 717/136 |
| 2006/0288301 A1 | 12/2006 | Hood et al. | |

(Continued)

FOREIGN PATENT DOCUMENTS

| | | |
|---|---|---|
| CN | 104969187 A | 10/2015 |
| CN | 108027720 A | 5/2018 |

(Continued)

OTHER PUBLICATIONS

Tarifa Mateo, Yeray. Entity component systems and data-oriented design. BS thesis. Universitat Politécnica de Catalunya, 2024.*

(Continued)

*Primary Examiner* — Francisco J Aponte
(74) *Attorney, Agent, or Firm* — Fish & Richardson P.C.

(57) ABSTRACT

Controlling data schema is provided for data object(s) in a data oriented architecture. Suggestions are provided for received data objects, including determining whether the received data object maps to one of multiple data types, and performing a conditional type inference to provide the one or more suggestions based on a result of the determining of whether the one of the data object maps to one of the multiple data types.

18 Claims, 8 Drawing Sheets

(56) References Cited

U.S. PATENT DOCUMENTS

| | | | | |
|---|---|---|---|---|
| 2008/0301644 | A1* | 12/2008 | Drepper ............. | G06F 9/44589 |
| | | | | 717/124 |
| 2008/0320453 | A1* | 12/2008 | Meijer ................... | G06F 8/423 |
| | | | | 717/140 |
| 2010/0023547 | A1 | 1/2010 | Brid | |
| 2010/0138778 | A1 | 6/2010 | Dewan et al. | |
| 2011/0276950 | A1* | 11/2011 | Fisher .................... | G06F 8/437 |
| | | | | 717/140 |
| 2013/0339421 | A1 | 12/2013 | Dawson et al. | |
| 2015/0248216 | A1 | 9/2015 | Li et al. | |
| 2016/0261550 | A1 | 9/2016 | Chang et al. | |
| 2017/0270418 | A1 | 9/2017 | Reschke et al. | |
| 2021/0105340 | A1* | 4/2021 | Grozdanov .............. | G06F 8/38 |
| 2021/0405825 | A1* | 12/2021 | Narayanan ............. | G06F 9/451 |
| 2021/0408258 | A1 | 12/2021 | Lavric et al. | |
| 2022/0066753 | A1* | 3/2022 | Namarvar ............. | G06F 16/254 |
| 2022/0236965 | A1 | 7/2022 | Rahill-Marier et al. | |
| 2022/0269489 | A1* | 8/2022 | Roth ....................... | A63F 13/63 |
| 2023/0083813 | A1 | 3/2023 | Soon-Shiong | |
| 2023/0418566 | A1* | 12/2023 | Athiwaratkun ..... | G06F 11/3684 |
| 2024/0201956 | A1* | 6/2024 | Rahill-Marier .......... | G06F 8/36 |
| 2025/0138912 | A1* | 5/2025 | Tricot .................... | G06F 9/547 |

FOREIGN PATENT DOCUMENTS

| | | |
|---|---|---|
| CN | 114849240 A | 8/2022 |
| WO | WO-2024167773 A1 * | 8/2024 |
| WO | 2024196419 A1 | 9/2024 |

OTHER PUBLICATIONS

Kirschnick, Johannes, Holmer Hemsen, and Volker Markl. "JEDI: Joint entity and relation detection using type inference." Proceedings of ACL-2016 System Demonstrations. 2016.*

International Search Report in International Appln. No. PCT/SG2024/050370, mailed on Aug. 18, 2024, 3 pages.

Non-Final Office Action for U.S. Appl. No. 18/341,014, mailed Apr. 2, 2025, 20 pages.

* cited by examiner

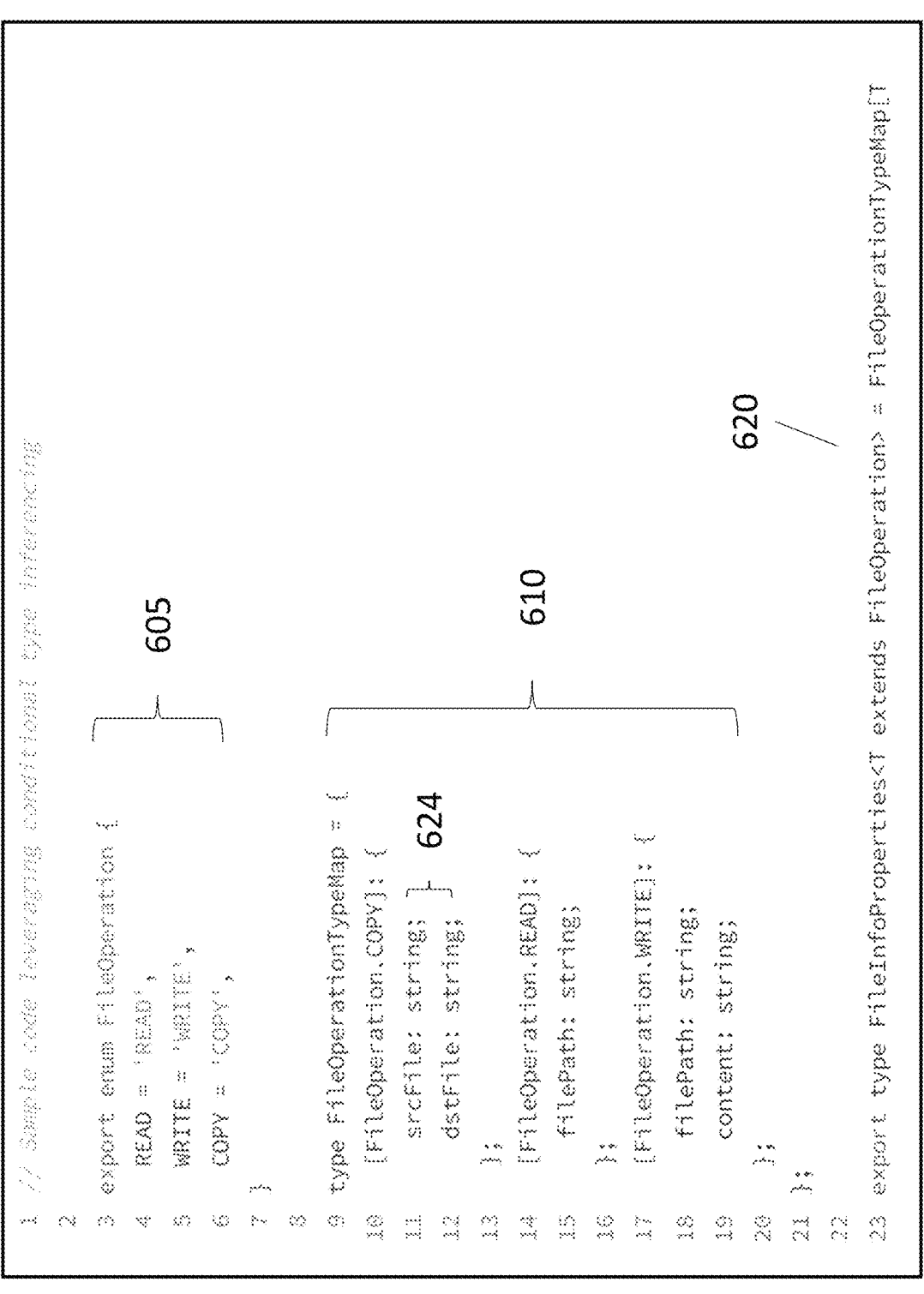

```
 1   // Sample code leveraging conditional type inferencing
 2
 3   export enum FileOperation {
 4       READ = 'READ',
 5       WRITE = 'WRITE',
 6       COPY = 'COPY',
 7   }                                        605
 8
 9   type FileOperationTypeMap = {
10       [FileOperation.COPY]: {
11           srcFile: string;          } 624
12           dstFile: string;
13       };
14       [FileOperation.READ]: {
15           filePath: string;
16       };
17       [FileOperation.WRITE]: {
18           filePath: string;
19           content: string;
20       };
21   };                                       610
22
23   export type FileInfoProperties<T extends FileOperation> = FileOperationTypeMap[T
```

CONTROLLING DATA SCHEMA FOR DATA ORIENTED ARCHITECTURE

FIELD

The embodiments described herein pertain generally to controlling data schema for a data oriented architecture. More specifically, the embodiments described herein pertain to methods and systems for controlling data schema for generation of a user interface in an entity component system.

BACKGROUND

An entity component system or architecture (referred to herein as "entity component system" or "ECS") may be used in many applications including, but not limited to effects engines or gaming engines for the generation of a virtual reality, augmented reality, and/or gaming environment. ECS systems typically follow data oriented design or architecture, in which the system may include entities that may represent players, characters, buildings, or anything else that may be part of the game, simulation, or augmentation. Each entity may include one or more components that may include properties that modify the behavior of the entity, e.g., an effect that may define or characterize the entity as possessing a particular aspect(s). The behavior of the entity may be changed, for example, by adding or removing components, which can be implemented by defining or controlling the schema of component data according to a data oriented design. The schema of component data can play an important role in performance of the application, effects engine, or gaming engine. For example, ECS systems may use component data to filter entities of concern. In order to configure and/or customize the properties of the entities and/or components, code associated with the configuring and/or customizing of the properties needs to be developed for rendering the user interface for use by the user of the application, effects engine, or gaming engine, which may be tedious, repetitive, and error-prone. Moreover, since the code must be developed, the developers or creators of the new entities or components for the entity component system must have coding knowledge, and particularly, front-end coding knowledge so that the user interface has the appropriate appearance to display the component and component properties, allow their editing, and also maintain the state of user controls for usability by the user of the application, effects engine, or gaming engine.

SUMMARY

Features in the embodiments disclosed herein may provide for controlling data schema for one or more data objects in a data oriented architecture. In one example embodiment, the data schema can be controlled for generation of a user interface including one or more components for one or more entities in an entity component system (ECS). Some embodiments described herein enable a user (e.g., a developer, a creator, etc.) to define components or component properties in a customized way by controlling data schema to enforce property definition schema or data layout of component data by using conditional type inferencing in a data oriented architecture, such that the adding, changing, or configuring of a component or entity in the entity component system is made easier and less error-prone.

Some embodiments described herein enable a user to add or configure a new data type for a new component or component property such as, for example, a player with a custom button or a custom label, by providing data definition with constraints on the data schema to prevent a user from providing invalid component property definitions. Some embodiments described herein can provide suggestions (e.g., a mapped data type or an indication of error) when populating the data definition for the components. As such, the embodiments disclosed herein provide for controlling data schema for one or more data objects in a data oriented architecture that a user (e.g., a developer or creator of effects engine, or gaming engine, or an end user of an application thereof) may use for interacting with the new component or entity, e.g., user interface or portion thereof for enforcing component properties in the application, effects engine, or gaming engine, and that an end user can control and/or modify values for the one or more entities and components.

In one example embodiment, a system for controlling data schema for one or more data objects in a data oriented architecture is provided. The system includes a memory to receive and store one or more data objects, and a processor to provide one or more suggestions. The processor is to determine whether one of the data objects maps to one of multiple data types, and perform a conditional type inference to provide the one or more suggestions based on a result of the determining of whether the one of the data object maps to one of the multiple data types.

In another example embodiment, a method for controlling data schema for one or more data objects in a data oriented architecture is provided. The method includes receiving one or more data objects, and providing one or more suggestions for one of the data objects. The providing of the one or more suggestions further includes determining whether a received one of the data objects maps to one of multiple data types, and performing a conditional type inference to provide the one or more suggestions based on a result of the determining of whether the one of the data object maps to one of the multiple data types.

In yet another example embodiment, a non-transitory computer-readable medium is provided to have computer-executable instructions stored thereon that, upon execution, cause one or more processors to perform operations including: receiving one or more data objects, and providing one or more suggestions for one of the data objects. The providing of the one or more suggestions further includes determining whether a received one of the data objects maps to one of multiple data types, and performing a conditional type inference to provide the one or more suggestions based on a result of the determining of whether the one of the data object maps to one of the multiple data types.

In yet another example embodiment, a system for controlling data schema for one or more data objects for generation of a user interface comprising one or more components for one or more entities in an entity component system (ECS) in a data oriented architecture is provided. The system includes a memory to receive and store one or more data objects, and a processor to provide one or more suggestions. The processor is to determine whether one of the data objects maps to one of multiple data types, and perform a conditional type inference to provide the one or more suggestions based on a result of the determining of whether the one of the data object maps to one of the multiple data types.

In yet another example embodiment, a method for controlling data schema for one or more data objects for generation of a user interface comprising one or more components for one or more entities in an entity component system (ECS) in a data oriented architecture is provided. The method includes receiving one or more data objects, and providing one or more suggestions for one of the data objects. The providing of the one or more suggestions further includes determining whether a received one of the data objects maps to one of multiple data types, and performing a conditional type inference to provide the one or more suggestions based on a result of the determining of whether the one of the data object maps to one of the multiple data types.

Various advantages are obtained in exemplary embodiments of the disclosure. One such advantage is that the data schema can be controlled by placing constraints thereon to prevent users from providing invalid property definitions. In an embodiment, when one or more data objects are received from a user, a conditional type inference can be performed to provide data type suggestions for the received data objects to enforce the property definition schema. With such suggestions, the user may customize, configure, or add a particular type of components, component properties, or widgets with the associated properties conforming to the data schema. In addition, when the received data objects do not conform to the data schema, indication of errors can be flagged out to the user while populating the data definition for the components, which can prevent the user from providing invalid property definitions. In this manner, dynamic type inferencing is provided for defining data contract rules, which can enforce data types of component data in a data oriented architecture.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Non-limiting and non-exhaustive descriptions are described with reference to the following drawings. The components in the figures are not necessarily to scale, emphasis instead being placed upon illustrating principles. In the detailed description that follows, embodiments are described as illustrations only since various changes and modifications may become apparent to those skilled in the art from the following detailed description.

FIG. 6A is an example of data objects used to control data schema using conditional type inferencing in a data oriented architecture, in accordance with at least some embodiment described herein.

DETAILED DESCRIPTION

Figure 1:
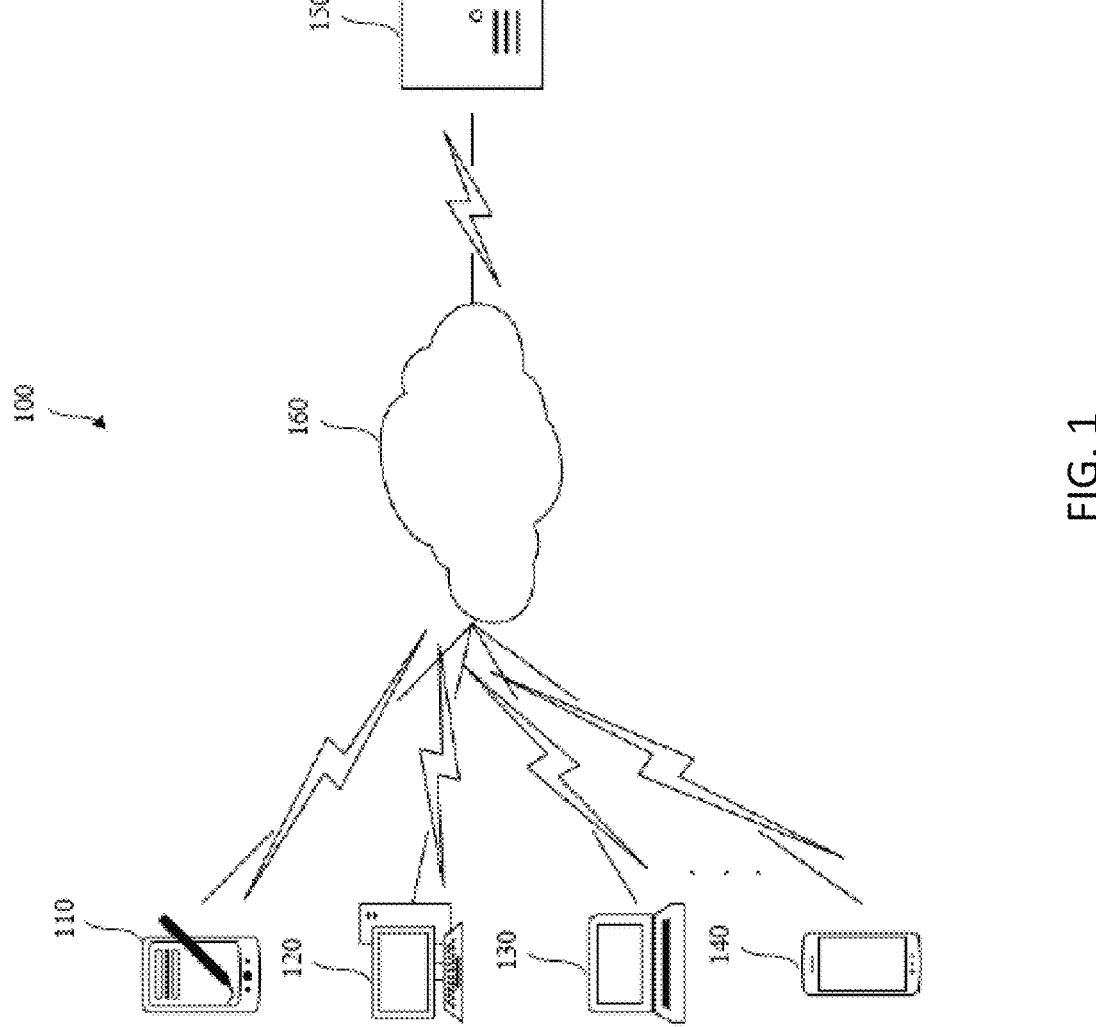
FIG. 1 is a schematic view of an example system for controlling data schema for data objects in a data oriented architecture, arranged in accordance with at least some embodiments described herein.

In the following detailed description, particular embodiments of the present disclosure are described herein with reference to the accompanying drawings, which form a part of the description. In this description, as well as in the drawings, like-referenced numbers represent elements that may perform the same, similar, or equivalent functions, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not intended to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

It is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure.

Additionally, the present disclosure may be described herein in terms of functional block components and various processing steps or modules. It should be appreciated that such functional blocks or modules may be realized by any number of hardware and/or software components configured to perform the specified functions, for example, when executed by a processor-enabled computing device.

The scope of the disclosure should be determined by the appended claims and their legal equivalents, rather than by the examples given herein. For example, the steps recited in any method claims may be executed in any order and are not limited to the order presented in the claims. Moreover, no element is essential to the practice of the disclosure unless specifically described herein as "critical" or "essential".

As referenced herein, a "data oriented architecture," "data oriented design," or "data oriented principle" is a term of art and may refer to an approach to software architecture for the development in various platforms that can optimize data structures or layouts to improve the robustness or performance of applications. For example, an "entity component system" or "ECS" architecture often follows a data oriented architecture to improve processing efficiency, in particular, when working with a large number of entities, components, and their associated data.

As referenced herein, a "data schema" may refer to the structured definition and organization of data within a system of a data oriented architecture. A data schema may include components such as, for example, data types, attributes, relationships, constraints, etc.

As referenced herein, an "entity component system" or "ECS" is an architectural pattern or paradigm that may be used in the development in various platforms, for example, including, but not limited to, social media applications, virtual reality applications, augmented reality applications, and effects or gaming engines. The entity component system may include one or more entities, one or more components, and one or more systems.

As referenced herein, an "entity" is a term of art and may refer to a general-purpose object, including, but not limited to, players, characters, buildings, or anything else that may be part of the game, simulation, or augmentation. The entity may include one or more components for defining or characterizing the entity.

As referenced herein, a "component" is a term of art and may refer to components and their respective properties that modify the behavior of the entity, e.g., an effect that may define or characterize the entity as possessing a particular aspect(s). It is to be understood that a component may include one or more properties. In some embodiments, the component may include data for modeling the aspect and may include data corresponding to one or more systems. In some embodiments, the data may include one or more of structures, classes, or associative arrays. In an example embodiment, the component may include a renderer component that may contain data relating to a three-dimensional (3D) model property that may define the 3D shape and appearance of the entity, such that the object may be rendered. Other components may include, but not limited to, collider components for interaction of the component with other objects, physics components for defining properties according to the laws of physics, etc.

As referenced herein, a "property field" may refer to data that represents a user interface control for a data type. For example, in an embodiment, the property field for a numeric type may be rendered as a number box, featuring the input validation and user controls associated with the input, editing, and range checking. In another embodiment, a property field for a 3-component vector may contain three number boxes, one for each component of the vector. The property field may also represent data for buttons, widgets, sliders, or other user interface controls.

As referenced herein, a "system" in the entity component system is a term of art and may refer to a process or system that acts on the components of various entities to result in the logic of the game, desired augmentations, or virtual reality generation in the entity component system. In an example embodiment, the ECS system may include, but not limited to, a rendering system that is configured to iterate over all renderer components such that any corresponding 3D models may be rendered in the correct positions, e.g., on the mapping or determined locations, a physics system that is configured to iterate over all components that provide physical definitions such that objects may move according to the laws of physics, detect collisions between objects, and cause objects to physically respond to those collisions in a realistic manner, or the like.

As referenced herein, "automated" or "automating" may refer to a process in which a system is configured to automatically translate one or more data objects that confirm to certain data schema in a data oriented architecture. For example, the data objects can be translated for the one or more components of the user interface or portion thereof into property fields to generate the user interface, in which the necessary code to manipulate or change the user interface or portion thereof is provided by the system, e.g., to auto-generate the user interface based on the one or more data objects. That is, a developer or creator of any new components for the user interface may not need to provide the code for generating the user interface or portion thereof at the front-end, but rather, only has to enter the data objects, e.g., the developer or creator does not need to have front end programming knowledge. In an embodiment, the system can determine whether the received data objects conform to certain data schema supported by the framework and provide corresponding suggestions. The system then provides the code, e.g., via a translation layer, corresponding to the property fields related to the data objects to generate, manipulate, or change the user interface or portion thereof including, but not limited to, space adjustments, formatting, pixel placement, re-arrangement of existing components, providing sliders, buttons, or input areas for adjusting or providing values, etc.

As referenced herein, "Effect House" is a system architecture that is configured to provide an interface between the developers and creators and one or more of the social media application, virtual reality application, augmented reality application, and effects or gaming engine. In an example embodiment, the Effect House is configured in a way such that developer or creator can add, change or remove existing components, and/or configure one or more entities and/or one or more components for creating effects for the entities.

As referenced herein, a "module" may refer to a network, algorithm, programs, hardware, or any combination thereof configured or otherwise provided to perform the recited function.

As referenced herein, a "conditional type inference," or "conditional type inferencing" is a term of art and may refer to an operation or function in various programming languages to determine or infer the type of expressions, variables, or values based on conditions in received data object(s). A conditional type inference may be implemented by various coding languages, such as, for example, Java, JavaScript, Smalltalk, C++, HTML, Script Resources, TypeScript, combinations thereof, e.g., TypeScript converted to JavaScript, or other coding languages. It is to be understood that the construct of conditional type inferencing may be implemented at different levels in different programming languages.

As referenced herein, a "language server protocol" or "LSP" may refer to a standardized protocol for communication between an editor or an integrated development environment (IDE) and a language server, which provides language-specific analysis and features to the editor. The editor may have a user interface (UI) to interact with a user e.g., a developer or creator), for the user to write, editor, and manage their inputs (e.g., codes, data objects, etc.).

Features in the embodiments disclosed herein may provide for controlling data schema for one or more data objects in a data oriented architecture. In one example embodiment, the data schema can be controlled for generation of a user interface including one or more components for one or more entities in an entity component system (ECS). Some embodiments described herein enable a user (a developer or creator of effects engine, or gaming engine, or an end user of an application thereof) to define components or component properties in a customized way by controlling data schema to enforce property definition schema or data layout of component data in a data oriented architecture, such that the adding, changing, or configuring of a component or entity in the entity component system is made easier and less error-prone, e.g., less coding errors. Some embodiments described herein enable a user to add or configure a new data type for a new component or component property such as, for example, a custom button or a custom label, by providing data definition with constraints on the data schema and preventing a user from providing invalid component property definitions. Some embodiments described herein can provide suggestions (e.g., a mapped data type or an indication of error) when populating the data definition for the components or component properties. As such, the embodiments disclosed herein provide for controlling data schema for one or more data objects in a data oriented architecture that a user of the application, effects engine, or gaming engine may use for interacting with the new component or entity, e.g., user interface or portion thereof for enforcing component properties in the application, effects engine, or gaming engine.

As discussed above, according to a data oriented design, it is important to define and control data schema for component data in an entity component system which defines the behavior of entities based on the component data. The schema of component data can also play an important role in the performance of the application, effects engine, or gaming engine. For example, an application may be an interface between users (e.g., developers or creators) and engines featuring an ECS architecture that may be used in social media applications, virtual reality applications, augmented reality applications, and effects or gaming engines. In an embodiment, the entity component system may include, but not limited to, entities, components, and systems for generating the game, simulation, or augmentation for the user. In an embodiment, the entity may represent game objects, such as, players, characters, buildings, or anything else that may be part of the game or simulation. The entities may include components that may be comprised of properties to modify, define, and/or characterize one or more behaviors of the entity(ies), e.g., an effect that may define or characterize the entity as possessing a particular aspect(s).

To configure entities and/or components in an entity component system, users can use a user interface (e.g., the Effect House user interface) of the system which provide user interface controls, allowing the users to add entities and/or components, and to customize the properties of the components added to an entity. The system may further include a rendering system for an automated rendering of such an interface.

In some embodiments of the entity component system, any game object can be created by adding the components to an entity and/or modified by changing the components of the entity, such that a developer or creator may be able to create effects, e.g., by modifying the components, for modifying the behavior of an entity in the entity component system for the one or more of the social media application, virtual reality application, augmented reality application, and effects or gaming engine, for example, via a system architecture, such as, the Effect House, which may be an interface between the developers and creators and the underlying effects or gaming engine. For example, the developer or creator may be able to use the Effect House to configure entities and components by adding, removing, and/or modifying the entities and components and to customize the properties of the components that have been added for each entity via a processor-enabled device. In some embodiments, to facilitate the use of the Effect House, a user interface may be provided for a user of the application, effects engine, or gaming engine, e.g., end user, to control and/or modify values for the one or more entities and components.

However, developing the code for data schema in in a data oriented architecture and enforcing the property definition in the data schema to render the user interface is tedious, repetitive, and error prone. For example, each time a new component is customized, configured, or added to the entity component system, a corresponding user interface must be painstakingly hand-coded anew at the front-end. Moreover, a user needs to know how an editor interacts with an underlying engine, and how user interface properties can transport values to the underlying engine. In addition, the new component must be communicated to the respective social media application, virtual reality application, augmented reality application, or effects or gaming engines such that the component is available to the user for using the component and/or the entity in the entity component system.

Furthermore, enforcing property definition schema or data layout of component data can be challenging. Lack of enforcing data layout in a data oriented architecture may lead to runtime errors or performance issues. For example, in a data oriented architecture, when the received data object(s) are not compliant with the framework of the system, the system may fall through cracks and may result in crashes or unexpected behavior.

As such, the embodiments discussed herein are directed to overcoming one or more of the deficiencies as discussed above. By the non-limiting embodiments described and recited herein, systems and methods for controlling data schema for one or more data objects in a data oriented architecture are provided. The data schema can be controlled by placing constraints thereon to prevent users from providing invalid property definitions. In an embodiment, when one or more data objects are received from a user, a conditional type inference can be performed to provide data type suggestions for the received data objects to enforce the property definition schema. With such suggestions, the user may customize, configure, or add a particular type of components, component properties, or widgets with the associated properties conforming to the data schema. In addition, when the received data objects do not conform to the data schema, indication of errors can be flagged out to the user while populating the data definition for the components, which can prevent the user from providing invalid property definitions. In this manner, dynamic type inferencing is provided for defining data contract rules, which can enforce data types of component data in a data oriented architecture.

The system and method having the features discussed herein may include one or more of the benefits including, for example, i) a control over the data layout of component properties to enforce property definition schema or data layout of component data, ii) an improved code quality, iii) providing guidance for users to provide property definition for new, customized components or component properties in a data oriented architecture.

Example embodiments for the systems and methods for controlling data schema for one or more data objects in a data oriented architecture are discussed further herein.

FIG. 1 is a schematic view of a network for controlling data schema for one or more data objects in a data oriented architecture and/or for generation of a user interface and adding, configuring, changing, or updating of components or component properties, e.g., property management, to provide interactive effects, e.g., behaviors, for one or more entities in a social media application, virtual reality application, augmented reality application, or effects or gaming engine arranged in accordance with at least some embodiments described herein.

The system 100 may include terminal devices 110, 120, 130, and 140, a network 160, and a server 150. It is to be understood that FIG. 1 only shows illustrative numbers of the terminal devices, the network, and the server. The embodiments described herein are not limited to the number of the terminal devices, the network, and/or the server described. That is, the number of terminal devices, networks, and/or servers described herein are provided for descriptive purposes only and are not intended to be limiting.

In accordance with at least some example embodiments, the terminal devices 110, 120, 130, and 140 may be various electronic devices. The various electronic devices may include but not be limited to a mobile device such as a smartphone, a tablet computer, an e-book reader, a laptop computer, a desktop computer, and/or any other suitable electronic devices. The terminal devices 110, 120, 130, and 140 may include the application, effects engine, or gaming engine for generating a virtual reality, augmented reality, and/or gaming environment. The terminal devices 110, 120, 130, and 140 may also include and/or be able to access the system architecture, such as, the Effect House, to add, remove, and/or modify at least one of components, component properties, or entities in the entity component system.

In accordance with at least some example embodiments, the network 160 may be a medium used to provide a communications link between the terminal devices 110, 120, 130, 140 and the server 150. The network 160 may be the Internet, a local area network (LAN), a wide area network (WAN), a local interconnect network (LIN), a cloud, etc. The network 160 may be implemented by various types of connections, such as a wired communications link, a wireless communications link, an optical fiber cable, etc.

In accordance with at least some example embodiments, the server 150 may be a server for providing various services to users using one or more of the terminal devices 110, 120, 130, and 140. The server 150 may be implemented by a distributed server cluster including multiple servers or may be implemented by a single server. The server 150 may include the application, effects engine, or gaming engine for generating a virtual reality, augmented reality, and/or gaming environment. The server 150 may also include the system architecture, such as, the Effect House, to add, remove, and/or modify at least one of components, component properties, or entities in the entity component system.

A user may use one or more of the terminal devices 110, 120, 130, and 140 to interact with the server 150 via the network 160. Various applications or localized interfaces thereof, such as social media applications, virtual reality applications, augmented reality applications, gaming applications, online shopping services, or the like, may be installed on the terminal devices 110, 120, 130, and 140.

It is to be understood that software applications or services according to the embodiments described herein and/or according to the services provided by the service providers may be performed by the server 150 and/or the terminal devices 110, 120, 130, and 140 (which may be referred to herein as user devices). Accordingly, the apparatus for the software applications and/or services may be arranged in the server 150 and/or in the terminal devices 110, 120, 130, and 140.

It is also to be understood that when a service is not performed remotely, the system 100 may not include the network 160, but include only the terminal device 110, 120, 130, and 140 and/or the server 150.

It is further to be understood that the terminal device 110, 120, 130, and 140 and/or the server 150 may each include one or more processors, a memory, and a storage device storing one or more programs. The terminal device 110, 120, 130, and 140 and/or the server 150 may also each include an Ethernet connector, a wireless fidelity receptor, etc. The one or more programs, when being executed by the one or more processors, may cause the one or more processors to perform the method(s) described in any embodiments described herein. Also, it is to be understood that a computer readable non-volatile medium may be provided according to the embodiments described herein. The computer readable medium stores computer programs. The computer programs are used to, when being executed by a processor, perform the method(s) described in any embodiments described herein.

Figure 2:
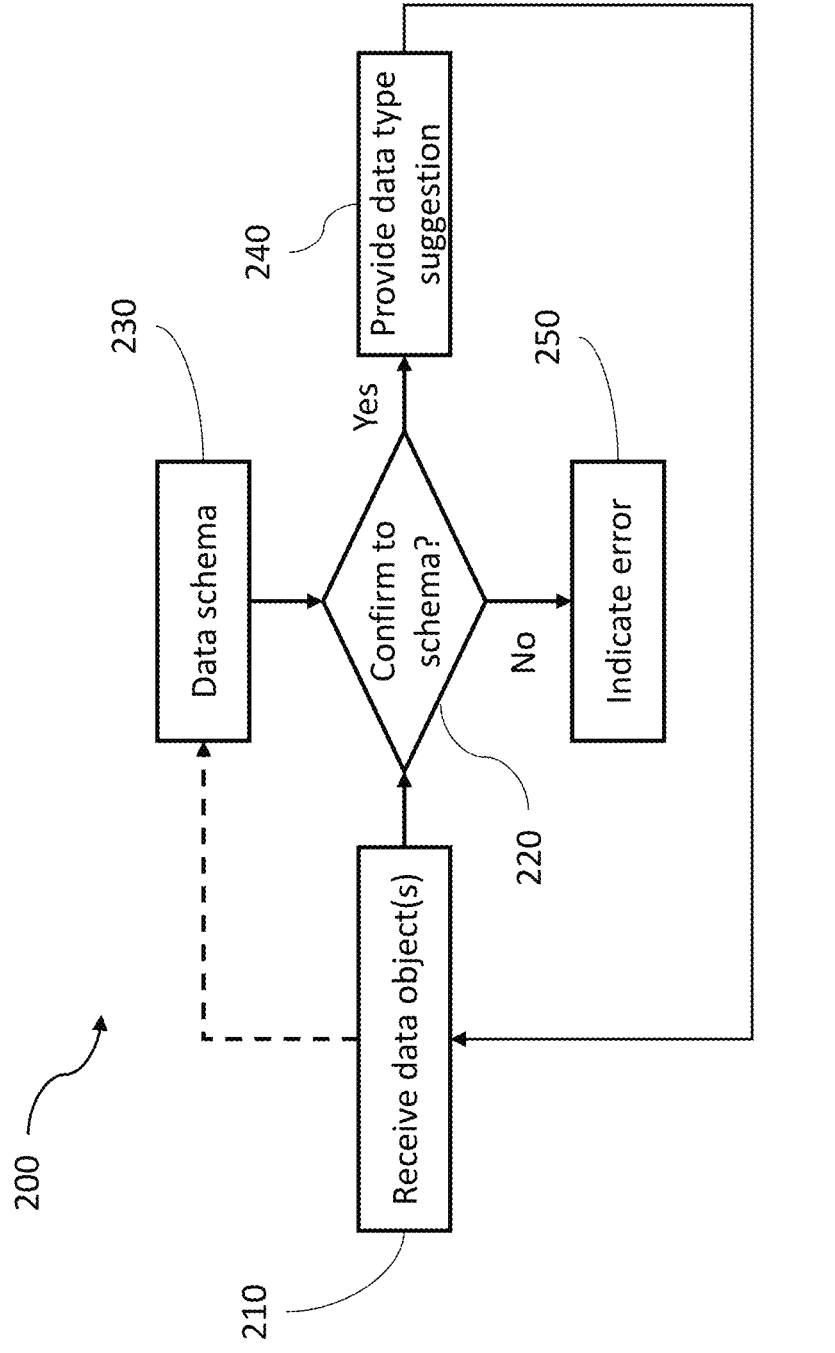
FIG. 2 is a flow chart illustrating an example processing flow for controlling data schema for data objects in a data oriented architecture, in accordance with at least some embodiments described herein.

FIG. 2 is a flow chart illustrating an example processing flow 200 for controlling data schema for one or more data objects in a data oriented architecture, which can be further used for property management and generation of a user interface or portion thereof (referred to herein as "user interface") that includes one or more components for one or more entities in an entity component system that may include any of the systems or modules to be discussed below, in accordance with at least some embodiments described herein.

Figure 7:
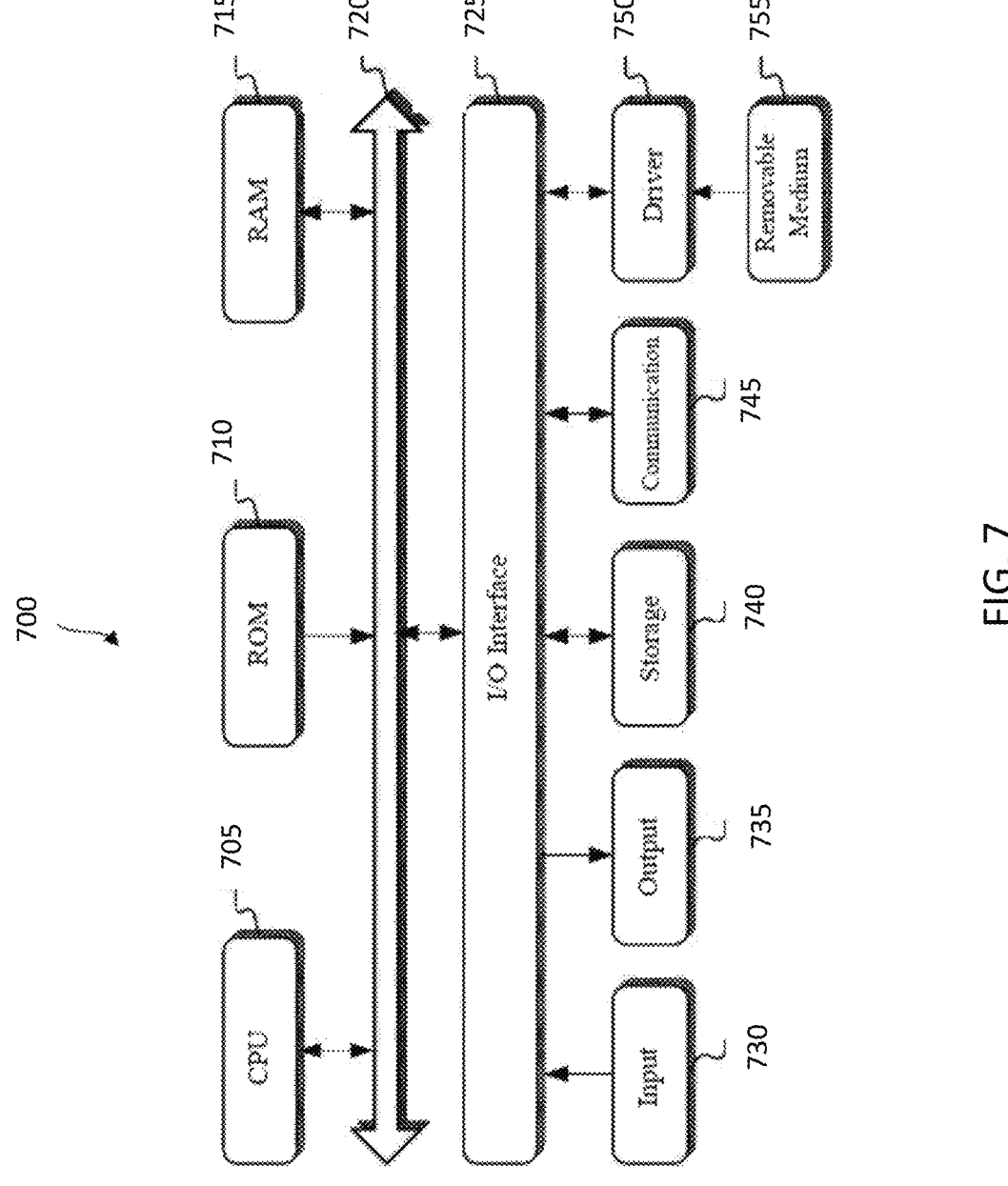
FIG. 7 is a schematic structural diagram of an example computer system applicable to implementing an electronic device, arranged in accordance with at least some embodiments described herein.

It is to be understood that the processing flow 200 disclosed herein can be conducted by one or more processors (e.g., the processor of one or more of the terminal device 110, 120, 130, and 140 of FIG. 1, the processor of the server 150 of FIG. 1, the central processor unit 705 of FIG. 7, and/or any other suitable processor), unless otherwise specified.

It is also to be understood that the processing flow 200 can include one or more operations, actions, or functions as illustrated by one or more of blocks 210, 220, 230, 240, 250. These various operations, functions, or actions may, for example, correspond to software, program code, or program instructions executable by a processor that causes the functions to be performed. Although illustrated as discrete blocks, obvious modifications may be made, e.g., two or more of the blocks may be re-ordered; further blocks may be added; and various blocks may be divided into additional blocks, combined into fewer blocks, or eliminated, depending on the desired implementation. It is to be understood that before the processing flow 200, operations including initializations or the like may be performed. For example, system parameters and/or application parameters may be initialized. Processing flow 200 may begin at block 210.

At block 210 (Receive data object(s)), the processor of the respective device(s) may be used to provide one or more data objects. In an embodiment, the data objects can be provided for one or more component properties for the one or more components for a user interface in an entity component system. The one or more data objects may be provided by a user (e.g., a developer or creator) for a new component or component property using a processor-enabled device, e.g., terminal devices 110, 120, 130, 140, and/or provided on the server, e.g., 150. The one or more data objects may then be received and/or sent by a component module of a system architecture. It is understood that the data objects may not be code themselves, but rather, objects representing component properties that may be processed (e.g., translated via component processing), by the system architecture to generate the user interface, e.g., into property fields for the user interface, in which the property field may represent a user interface control for a data type, for example, in an inspector panel having the components or another portion of the user interface.

In an embodiment, the component properties may be defined as a list of ComponentPropertyInfo objects or members, in which each component property may correspond to property fields for generating the user interface or portion thereof, as well as attributes for communicating property update events to the application and/or effects or gaming engine, e.g., stored in a lookup table (LUT) or library. For example, in an embodiment, a property field for a data object of a component property that includes "numeric type" may be translated by the system architecture, e.g., by a property fields provider module, to render a number box for the user interface that may feature input validation and user controls associated with the input, editing, and range checking. The processing flow may then proceed to 220.

At block 220 (Confirm to schema?), the processor enabled device for the system architecture may be configured to determine whether the received data object(s) conforms to a confirmation of data schema 230. In an embodiment, the data schema 230 may be confirmed or controlled to include a mapping between a list of data types and a list of values (e.g., input keys) corresponding to the respective data types. In an embodiment, the list of data types may include one or more customized data types each may include one or more customized members. The one or more members of the data type may represent customized component properties and correspond to the respective property fields for generating the user interface or portion thereof, as well as attributes for communicating property update events to the application and/or effects or gaming engine. In an embodiment, the list of data types may include one or more existing data types which is supported by the framework of the data oriented architecture.

When the received data object(s) indicates one of the input keys in the mapping, the received data object(s) can be determined to map to one of the data types in the data schema 230, and the processing flow may then proceed to 240. When the received data object(s) indicates none of the input keys in the mapping, it is determined that the received data object(s) may not map to one of the data types in the data schema 230, and the processing flow may then proceed to 250.

At block 240 (Provide data type suggestion), the processor enabled device for the system architecture may be configured to perform a conditional type inference to provide one or more suggestions based on a result of the determining of the one of the data object mapping to one of the multiple data types. In an embodiment, when the received data object(s) indicates one of the input keys in the mapping, and the received data object(s) maps to one of the data types in the data schema 230, the conditional type inference can be performed to provided one or more data type suggestions corresponding to the received data object(s). The data type suggestions may be displayed, via an editor interface, on a processor-enabled device, e.g., terminal devices 110, 120, 130, 140. With the provided suggestions, a user (e.g., a developer or creator) may provide additional data object(s) being consistent with the suggestions and conforming to the data schema 230.

The received data object(s) at 210 that conform to the data schema 230 can be registered, via a component registry module, for rendering the user interface based on the component properties, in an automated manner, e.g., via translation to property fields using a property fields provider module. Exemplary system architectures and processes for management and automated generation of a user interface in an entity component system are described in U.S. patent application Ser. No. 18/341,014, which is incorporated by reference herein.

At block 250 (Indicate error), the processor enabled device for the system architecture may be configured to indicate an error. In an embodiment, the conditional type inference may be performed to indicate a data type error. For example, when the received data object(s) does not map to one of the one of the data types in the data schema 230, one or more members of the mapped data type are missing, or the type of the one or more members is incorrect, the conditional type inference may be performed to generate an indication of error, and a language server protocol or a code editor may prohibit the compilation of the codes, and flag out the error to the user by displaying the indication of error, via an editor interface, on a processor-enabled device, e.g., terminal devices 110, 120, 130, 140.

Figure 3:
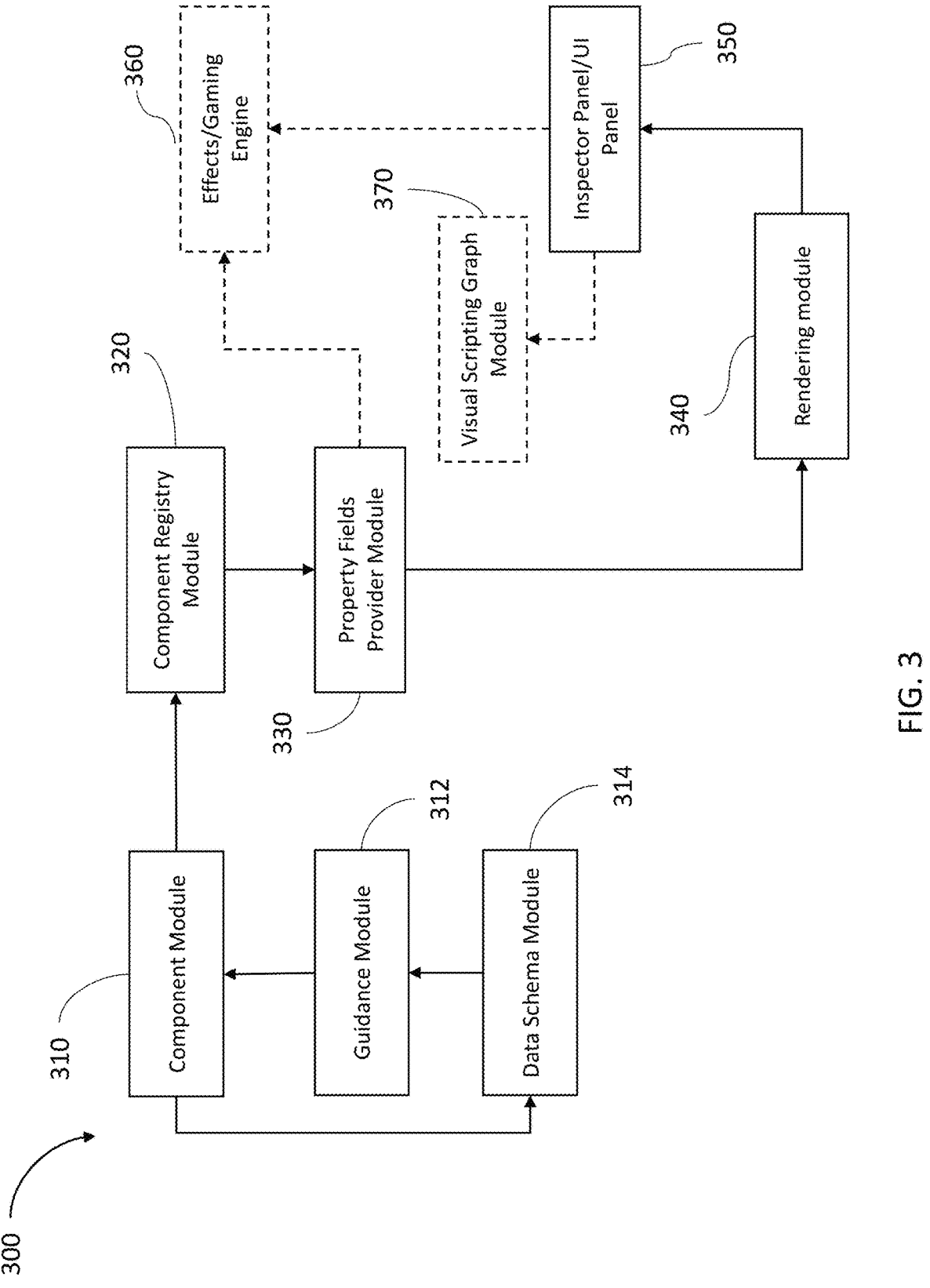
FIG. 3 is a schematic illustration of an example system architecture for controlling data schema for generation of a user interface in an entity component system (ECS), in accordance with at least some embodiments described herein.

FIG. 3 is a schematic illustration of an example system architecture 300 for controlling data schema for one or more data objects for generation of a user interface or portion thereof (referred to herein as "user interface") that includes one or more components for one or more entities in an entity component system, in accordance with at least some embodiments described herein. In an embodiment, the system architecture 300 may be a system, such as, Effect House, that is configured to provide an interface between developers and creators and one or more of the social media application, virtual reality application, augmented reality application, and effects or gaming engine. In an example embodiment, the system architecture 300 is configured in a way such that the developer or creator can add, change or remove existing components, and/or configure one or more entities and/or one or more components for creating interactive effects for the entities in the entity component system for use by a user of the social media application, virtual reality application, augmented reality application, or effects or gaming engine. Once the user has made any modifications or changes to the component and/or component properties for the entities on a user interface, e.g., customizing properties of the component(s), the system architecture 300 may be used to generate the entity component system for the virtual reality, augmented reality, and/or gaming environment, e.g., by the server 150 or locally by the terminal device(s). It is to be understood that the system architecture 300 disclosed herein may be a function, an operation, an action, an algorithm, an application, or the like that is implemented, designed, stored, executed, performed, or otherwise hosted in an electronic device (e.g., 700 of FIG. 7, etc.), central processing unit ("CPU"), or other processor-enabled device, which may be a cloud-based network, a local device, or downloaded to the local device, a server, a smartphone, a tablet computer, a laptop computer, a desk computer, (e.g., the terminal device 110, 120, 130, and 140 of FIG. 1, or the server 150 of FIG. 1), and/or any other suitable electronic device. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or any combination thereof.

As illustrated in FIG. 3, the system architecture 300 includes one or more of a component module 310, guidance module 312, data schema module 314, component registry module 320, property fields provider module 330, rendering module 340, inspector panel/user interface panel 350, an application or effects or gaming engine 360 that receives the updated or new component for one or more entities in the virtual reality, augmented reality, and/or gaming environment, e.g., implementing interactive feature(s) for the one or more entities based on the one or more components in the entity component system, and a visual scripting graph module 370.

It is appreciated that by having such system architecture 300, the developer or creator of a new or modified component may not have to or no longer has to write code necessary for controlling data schema for data object(s) for rendering the user interface, e.g., display and/or controls for interacting with the component, code for storing or retrieving component properties, or code for sending component property updates to the application, effects engine, or gaming engine. Instead, the system architecture 300 is configured to receive the data representation of the component properties, e.g., data objects, e.g., in an array such as a JSON array, provide suggestions to make sure that the received data objects conform to data schema in a data oriented architecture, register the conformed data objects in the component registry module 320, and render the user interface based on the component properties, in an automated manner, e.g., via translation to property fields using the property fields provider module 330. The system architecture 300 may be further configured to handle the storage, retrieval, and propagation of component property updates to the application, effects engine, or gaming engine, when the data object of the component property is specified to be an engine property. The user interface may then be used to adjust values of the component(s) rendered on the user interface, such that the user of the application, effects engine, or gaming engine may interact with the new component, e.g., an interactive feature, such as, face-stretch, face-mask, cat-face, or the like. As such, by providing data objects as representations of component properties and conforming the data objects to a controlled data schema, the system architecture 300 may be able to enforce property definition schema or data layout of component data in a data oriented architecture, and prevent a user from providing invalid property definitions, thus making the code or logic flexible, easy to modify and maintain, and be able to be reused in many different types of software applications. The details of the system architecture 300 are discussed further below.

The component module 310 may refer to one or more modules that are designed, programmed, or otherwise configured to receive one or more data objects in a data oriented architecture, for example, for one or more component properties of the one or more components for the user interface. In an embodiment, the one or more data objects may be provided by the developer or creator of the new component or component property using a processor-enabled device, e.g., terminal devices 110, 120, 130, 140, and/or provided on the server, e.g., 150. The one or more data objects may then be received and/or sent by the component module 310 of the system architecture 300. It is understood that the data objects may not be code themselves, but rather, objects representing component properties that may be translated, e.g., component processing, by the system architecture to generate the user interface, e.g., property fields for the user interface, in which the property field may represent a user interface control for a data type. In an embodiment, the component properties may be defined as a list of objects such as ComponentPropertyInfo objects, in which each component property may correspond to property fields for generating the user interface, as well as attributes for communicating property update events to the application and/or effects or gaming engine, e.g., stored in a LUT or library. For example, in an embodiment, a property field for a data object of a component property that includes "numeric type" may be translated by the system architecture 300, e.g., by the property fields provider module 330, to render a number box for the user interface that may feature input validation and user controls associated with the input, editing, and range checking.

The data schema module 314 may refer to one or more modules that are designed, programmed, or otherwise configured to determine whether the received data object(s) confirm to data schema 230 of FIG. 2. In an embodiment, the data schema module 314 may provide a mapping between a list of data types and a list of values (e.g., input keys) corresponding to the respective data types. In an embodiment, the list of data types may include one or more customized data types each may include one or more customized members. The one or more members of the data type may represent customized component properties and correspond to the respective property fields for generating the user interface or portion thereof, as well as attributes for communicating property update events to the application and/or effects or gaming engine. In an embodiment, the list of data types may include one or more existing data types which is supported by the framework of the data oriented architecture.

The guidance module 312 may refer to one or more modules that are designed, programmed, or otherwise configured to perform a conditional type inference to provide one or more suggestions based on a result of the determining of whether the one of the data object maps to one of the multiple data types. In an embodiment, when the received data object(s) indicates one of the input keys in the mapping, and the received data object(s) maps to one of the data types in the data schema, e.g., 230, the conditional type inference can be performed to provided one or more data type suggestions corresponding to the received data object(s). The data type suggestions may be displayed, via an editor interface, on a processor-enabled device, e.g., terminal devices 110, 120, 130, 140. With the provided suggestions, a user (e.g., a developer or creator) may provide data object(s) being consistent with the suggestions. In addition, the guidance module 312 may be configured to indicate an error. In an embodiment, the conditional type inference may be performed to indicate a data type error. For example, when data schema module 314 determines that the received data object(s) does not map to one of the one of the data types in the data schema, e.g., 230, one or more members of the mapped data type are missing, or the type of the one or more members is incorrect, the guidance module 312 may be configured to perform the conditional type inference to generate an indication of error, prohibit the compilation of the codes, and flag out the indication of error to the user by displaying the indication, via an editor interface, on a processor-enabled device, e.g., terminal devices 110, 120, 130, 140.

The component registry module 320 may refer to one or more modules that are designed, programmed, or otherwise configured to store the data objects for the one or more component properties in storage.

The property fields provider module 330 may refer to one or more modules that are designed, programmed, or otherwise configured to access the data objects on the storage and determine property fields for the user interface corresponding to the data objects to generate the user interface in an automated manner.

The rendering module 340 may refer to one or more modules that are designed, programmed, or otherwise configured to generate and/or render the properties to generate the user interface comprising the one or more components, in an automated manner, based on the property fields of the existing one or more components of the user interface, e.g., by invoking the property fields provider module 330.

The inspector panel/user interface panel 350 may refer to one or more modules that are designed, programmed, or otherwise configured to provide an interface for the user with the components and/or component properties provided by the system architecture 300, e.g., the generated user interface based on the property fields corresponding to the one or more data objects.

The application or effects/gaming engine 360 may refer to one or more modules that are designed, programmed, or otherwise configured to generate the virtual reality, augmented reality, and/or gaming environment based on the components, component properties, and entities in the entity component system, in which the property fields updates on the generated user interface may be communicated to the application or effects/gaming engine 360, e.g., from the property fields provider module 330 and/or the user interface 350 or other component of the system architecture 300.

The virtual scripting graph module 370 may refer to one or more modules that are designed, programmed, or otherwise configured to provide visual representation of logic for the system architecture 300.

Examples of a component registry module, a property fields provider module, a rendering module, an inspector panel/user interface panel, an application or effects or gaming engine, and a visual scripting graph module, for management and automated generation of a user interface in an entity component system are described in U.S. patent application Ser. No. 18/341,014.

It is appreciated that while the data objects are discussed herein as related to the one or more component properties, such disclosure is not intended to be limiting. Rather, the use of the data objects instead of code may be used to add, configure, remove, or modify various properties, including, but not limited to, adding, removing, or modifying entities or components or systems acting on the components and entities in the entity component system.

Figure 4:
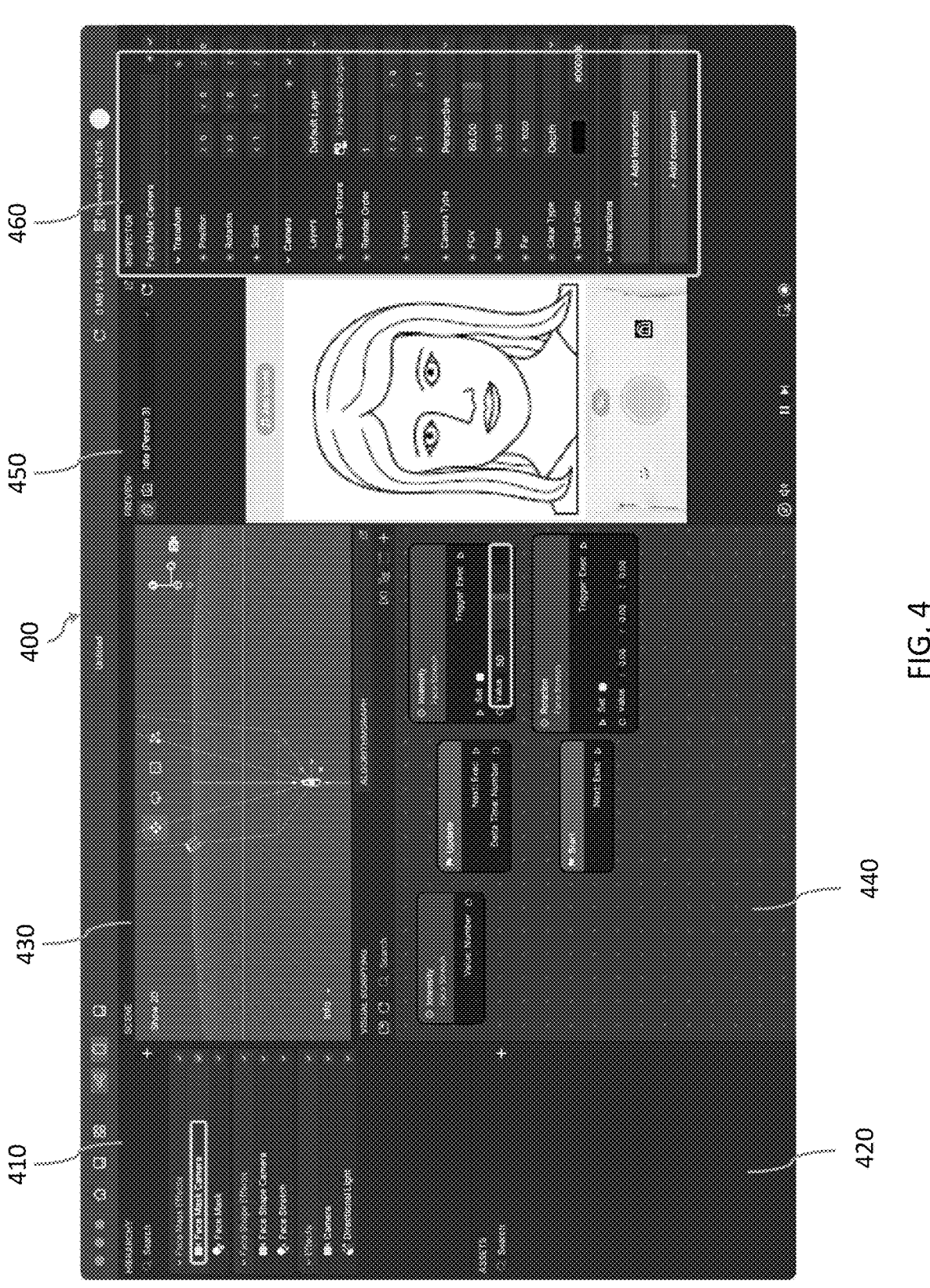
FIG. 4 is an example of a user interface generated by a system architecture or processing flow for controlling data schema for data objects in a data oriented architecture, in accordance with at least some embodiment described herein.

FIG. 4 is an example embodiment of a user interface 400 generated by the processing flow 200 of FIG. 2 and/or the system architecture 300 of FIG. 3, as discussed above. In an embodiment, the user interface 400 may be the interface generated by the system architecture, e.g., 300, such as Effect House. As such, the user interface 400 may be configured as the interface between the developers and creators and one or more of the social media application, virtual reality application, augmented reality application, and effects or gaming engine. For example, the system architecture may be configured in a way such that the developer or creator can add, change, configure or remove existing components, and/or configure one or more entities and/or one or more components for creating effects for the entities, such that the user of the application or effects or gaming engine may be able to use the interactive effect of the component created by the developer or creator.

The user interface 400 includes a hierarchy panel 410, an assets panel 420, a scene panel 430, visual scripting panel 440, a preview panel 450, and an inspector panel 460. The hierarchy panel 410 may be configured to display the components and component properties, e.g., effects, that have been added to the system architecture, e.g., built-in objects or projects. The assets panel 420 may be configured to access original or pre-made assets, for example, Textures, 3D, 2D, Materials, Face Effects, Filters, Screen Effects, audio etc. that may be stored in an assets library, for importation to the user interface 400, e.g., that may be needed to build an effect. The scene panel 430 may be configured to show a 3D or 2D view of all the objects added to an effect, and control the view thereof. The visual scripting panel 440 may be configured to allow visual block scripting through nodes, in which the nodes may be linked together with connectors to create paths of logic, e.g., similar to text scripting, like JavaScript or C++. The preview panel 450 may be configured to allow the developer or creator to see how the effect may look when used in the application or by the effects or gaming engine, e.g., on a selected preview video or image. The inspector panel 460 may be configured to view and edit components and properties for changing or modifying the effect.

While the system architecture and processing flow will be discussed with respect to generating the inspector panel 460 of the user interface 400, it is understood that such disclosure is not intended to be limiting. Rather, it is understood that the system architecture and processing flow may also be used to modify or add components of other portions of the user interface 400 as well.

Referring back to FIG. 4, the inspector panel 460 includes one or more components and/or properties, such as, Face Mask Camera, Face Mask, Face Shape Camera, Face Stretch, camera, Directional Light, etc., and properties, such as, transform, layers, render texture, render order, viewport, camera type, Field of View (FOV), near, far, clear type, clear color, interactions, etc. As such, an end user can modify the values of the properties and components by using one or more of: inputting Boolean or Boolean operators, values for three-dimensional coordinate selection, selecting properties via a drop-down menu, sliding via slider, color selection, etc., for providing an interactive effect for use in the application or effects or gaming engine.

As seen in FIG. 4, the inspector panel has a specific format for displaying the components and properties. As such, developing the code for adding, configuring, and updating components or component properties in a customized way and rendering the user interface is tedious, repetitive, and error prone. For example, each time a new component or component property is added to the entity component system, the corresponding user interface must be painstakingly hand-coded anew at the front-end to enforce data types of component data. Moreover, the new components must be communicated to the respective social media application, virtual reality application, augmented reality application, or effects or gaming engines such that the component is available to the user for using the component and/or the entity in the entity component system.

However, by using the system architecture, e.g., 300 of FIG. 3, and/or the processing flow, e.g., 200 of FIG. 2, as discussed above, controlling data schema for one or more data objects in a data oriented architecture, e.g., for generation of a user interface or portion thereof (referred to herein as "user interface") that includes one or more components for one or more entities in an entity component system may be simplified, e.g., easier and with less errors in the code, when adding (or modifying) new, customized components (or entities) and enforcing data types or data layout of component data for the new, customized component properties in the entity component system. For example, in an embodiment, the system architecture or framework can interpret the received data objects and provide the corresponding data type suggestions that conform to a certain data schema, which can prevent a developer or creator from providing invalid property definitions when populating the data definition for the components or component properties. In an embodiment, the data schema may be customized or defined by a user by, for example, including a mapping between a list of data types and a list of values (e.g., input keys) corresponding to the respective data types. Conditional type inferencing can be performed to provide the suggestions (e.g., data type suggestions or indication of an error) based on the constrains on the data definition of the components provided in the data schema. In an embodiment, the system architecture or framework can interpret the received data objects from a user and provide the corresponding data type suggestions that conform to a predefined, or pre-customized data schema.

Figure 5:
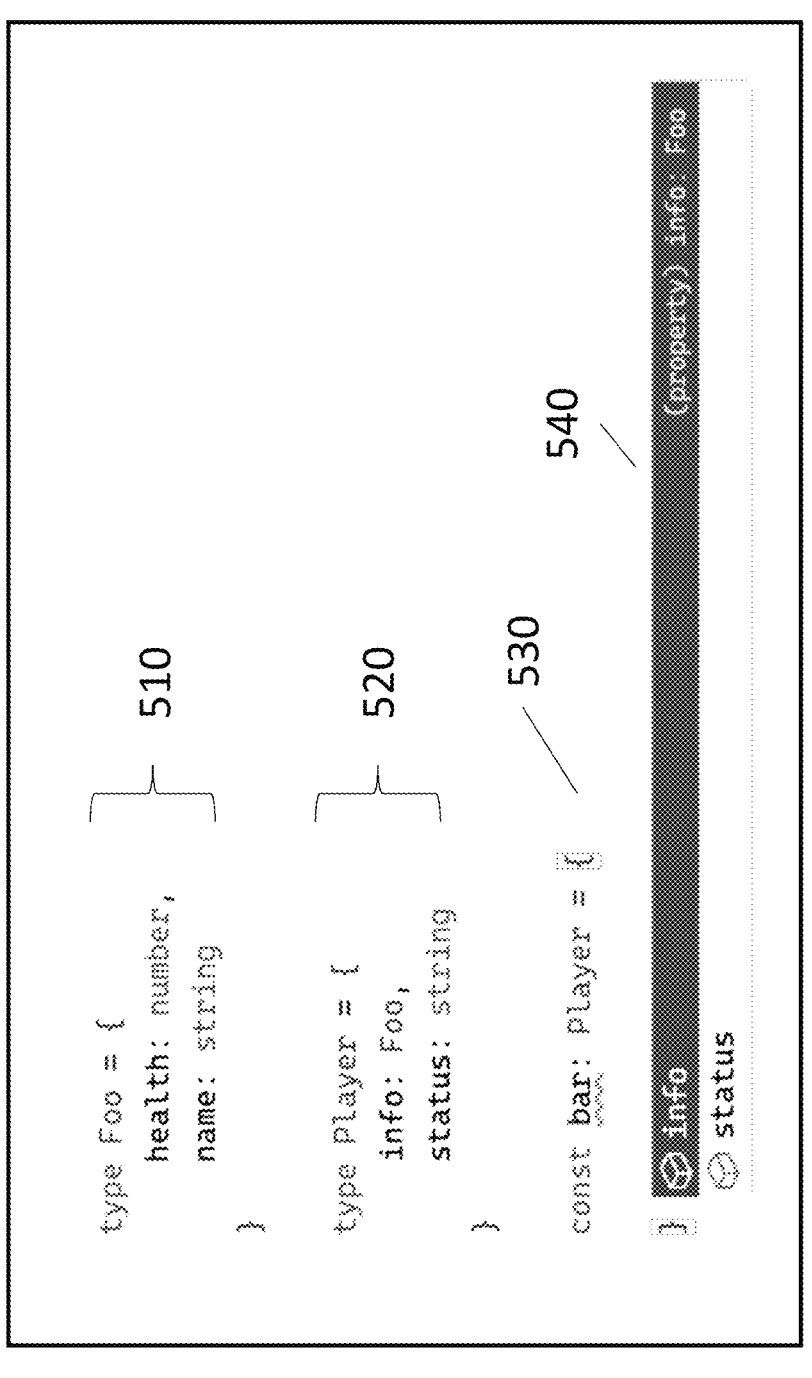
FIG. 5 is an example of data objects used to control data schema in a data oriented architecture, in accordance with at least some embodiment described herein.

FIG. 5 is an example of data objects used to define or control data schema in a data oriented architecture, in accordance with at least some embodiment described herein. Data objects 510 are used to define a custom data type, e.g., named "Foo". Data objects 520 are used to define another custom data type named "Player", which containerizes the custom data type named "Foo". When a variable 530 of the data type "Player" or "Foo" is initialized, an editor or a language server protocol can provide auto-completion suggestions 540 for the expected members and their types within the defined data types 510 and 520. Such auto-completion suggestion can help a user to provide data objects that adhere to the defined data schema such as, in this example, the data types "Player" and "Foo".

Figure 6B:
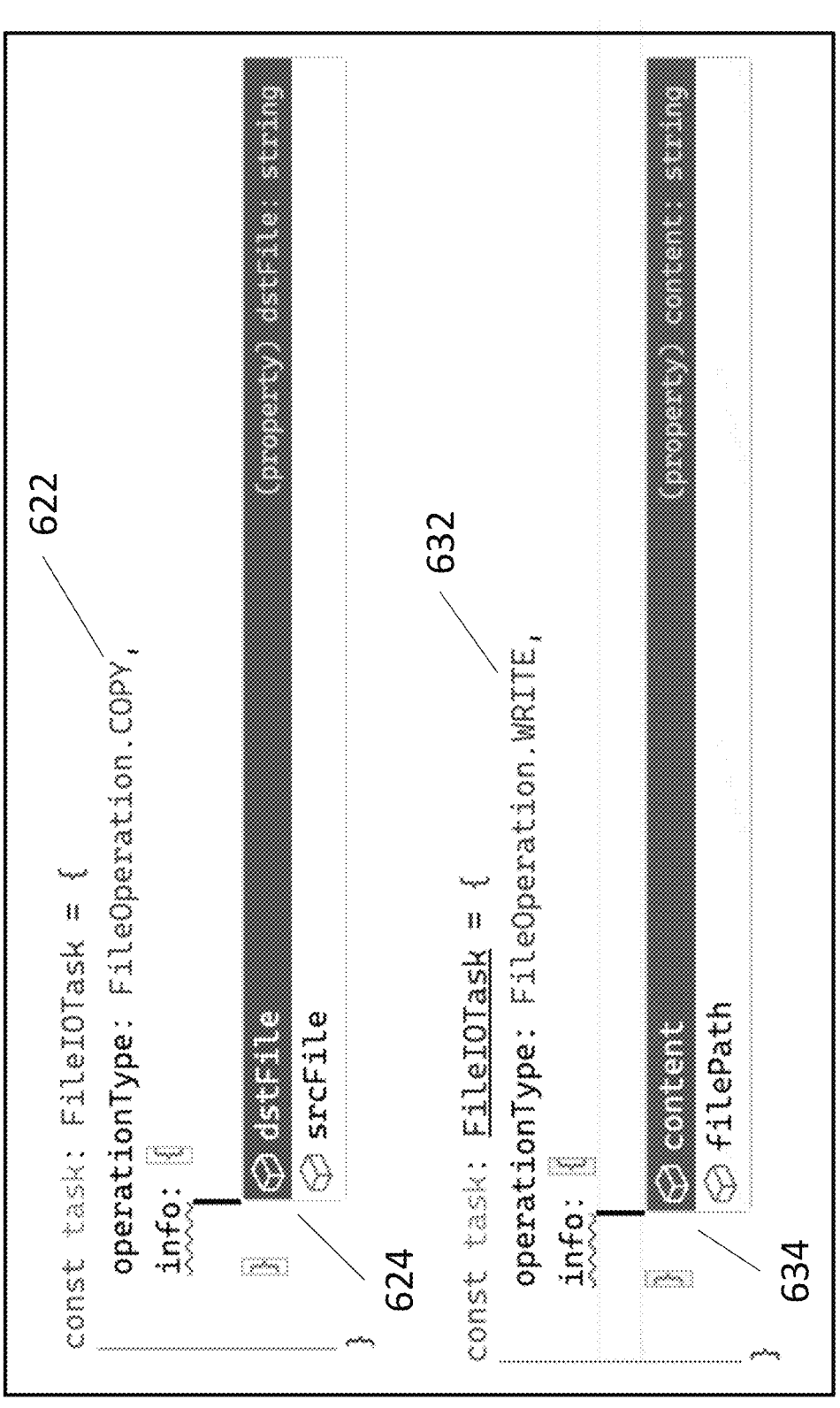
FIG. 6B is an example of user guidance provided by a system architecture or processing flow using the conditional type inferencing of FIG. 6A.

FIG. 6A is an example of data objects used for conditional type inferencing in a data oriented architecture, in accordance with at least some embodiment described herein. Data objects 610 are used to define a mapping that maps each value ("READ", "WRITE", "COPY") from data objects 605 to a customized data type. That is, data objects 605 provide input keys for the mapping 610. For example, the data type "FileOperationTypeMap [FileOperation.COPY]" maps to the input key "COPY", the data type "FileOperation-TypeMap [FileOperation.WRITE]" maps to the input key "WRITE", and the data type "FileOperationTypeMap [File-Operation.READ]" maps to the input key "READ". A conditional type inference 620 is performed based on the mapping 610, by taking one of the input keys in 605 ("READ", "WRITE", "COPY") and inferring the corresponding data type ("FileOperationTypeMap [FileOpera-tion.READ]", "FileOperationTypeMap [FileOperation. WRITE]", "FileOperationTypeMap [FileOperation. COPY]") in 610. In an embodiment, each of the data types includes one or more members which can be populated for one or more property fields of a component. For example, the data type ("FileOperationTypeMap [FileOperation. COPY]") includes members 624 ("dstFile" and "srcFile"). The conditional type inference 620 allows the generation of user guidance according to a received data object indicating one of the input keys in the mapping 610, as further illustrated in FIG. 6B.

FIG. 6B is an example of user guidance provided by a system architecture or processing flow using the conditional type inferencing 620 of FIG. 6A. When the received data object 622 maps to one of the input keys in the mapping 610 (e.g., the operationType is set to "COPY"), the conditional type inference 620 can populate the members 624 ("dstFile" and "srcFile") of the mapped data type ("FileOperation-TypeMap [FileOperation.COPY]") as the expected property fields based on the mapping 610 of FIG. 6A. When the received data object 632 maps to one of the input keys in the mapping 610 (e.g., the operationType is set to "WRITE"), the conditional type inference 620 can populate the members 634 ("content" and "filePath") of the mapped data type ("FileOperationTypeMap [FileOperation.WRITE]") as the expected property fields based on the mapping 610 of FIG. 6A. In this manner, a language server or code editor can automatically interpret the received data object and prompt the corresponding property fields of a component for the user, for example, in an editor interface.

FIG. 7 is a schematic structural diagram of an example computer system 700 applicable to implementing an electronic device (for example, the server or one of the terminal devices shown in FIG. 1), arranged in accordance with at least some embodiments described herein. It is to be understood that the computer system shown in FIG. 7 is provided for illustration only instead of limiting the functions and applications of the embodiments described herein.

As depicted, the computer system 700 may include a central processing unit (CPU) 705. The CPU 705 may perform various operations and processing based on programs stored in a read-only memory (ROM) 710 or programs loaded from a storage device 740 to a random-access memory (RAM) 715. The RAM 715 may also store various data and programs required for operations of the system 700. The CPU 705, the ROM 710, and the RAM 715 may be connected to each other via a bus 720. An input/output (I/O) interface 725 may also be connected to the bus 720.

The components connected to the I/O interface 725 may further include an input device 730 including a keyboard, a mouse, a digital pen, a drawing pad, or the like; an output device 735 including a display such as a liquid crystal display (LCD), a speaker, or the like; a storage device 740 including a hard disk or the like; and a communication device 745 including a network interface card such as a LAN card, a modem, or the like. The communication device 745 may perform communication processing via a network such as the Internet, a WAN, a LAN, a LIN, a cloud, etc. In an embodiment, a driver 750 may also be connected to the I/O interface 725. A removable medium 755 such as a magnetic disk, an optical disk, a magneto-optical disk, a semiconductor memory, or the like may be mounted on the driver 750 as desired, such that a computer program read from the removable medium 755 may be installed in the storage device 740.

It is to be understood that the processes described with reference to the flowcharts and/or the processes described in other figures may be implemented as computer software programs or in hardware. The computer program product may include a computer program stored in a computer readable non-volatile medium. The computer program includes program codes for performing the method shown in the flowcharts.

It is to be understood that the disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., a field programmable gate array, an application specific integrated circuit, or the like.

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory, electrically erasable programmable read-only memory, and flash memory devices; magnetic disks, e.g., internal hard disks or removable disks; magneto optical disks; and compact disc read-only memory and digital video disc read-only memory disks. The processor and the memory can be supplemented by, or incorporated in, special purpose logic circuitry.

It is to be understood that different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by both this disclosure. It is indeed intended that the scope of this disclosure should be determined by a proper legal interpretation and construction of the disclosure, including equivalents, as understood by those of skill in the art relying upon the complete disclosure present at the time of filing.

Aspects:

It is appreciated that any one of aspects can be combined with each other.

Aspect 1. A system for controlling data schema for one or more data objects in a data oriented architecture, the system comprising:

a memory to receive and store one or more data objects; and a processor to provide one or more suggestions, wherein the processor is to:

determine whether one of the data objects maps to one of multiple data types; and perform a conditional type inference to provide the one or more suggestions based on a result of the determining of whether the one of the data object maps to one of the multiple data types.

Aspect 2. The system of Aspect 1, wherein the processor is to perform the conditional type inference to provide the mapped one of the multiple data types as a data type suggestion.

Aspect 3. The system of Aspect 1, wherein the processor is to perform the conditional type inference to provide an indication of an error.

Aspect 4. The system of any of Aspects 1-3, wherein the processor is to further generate a user interface comprising one or more components for one or more entities in an entity component system (ECS), wherein the one or more data objects represent the one or more components to be generated for the user interface.

Aspect 5. The system of Aspect 4, wherein to provide the one or more suggestions further comprises to populate one or more members of the mapped one of the multiple data types for one or more property fields of one of the components.

Aspect 6. The system of Aspect 5, wherein the processor is to further determine the one or more property fields for the user interface corresponding to the one or more members.

Aspect 7. The system of any of Aspects 1-6, wherein the multiple data types comprise one or more customized data types.

Aspect 8. The system of any of Aspects 1-7, wherein the multiple data types comprise one or more existing data types.

Aspect 9. The system of any of Aspects 1-8, wherein the processor is to further determine whether the one or more data objects includes an input key for the mapping to the multiple data types.

Aspect 10. The system of any of Aspects 1-9, wherein the processor is to further display, via an editor interface, the one or more suggestions.

Aspect 11. A method for controlling data schema for one or more data objects in a data oriented architecture, the method comprising:

receiving one or more data objects; and providing one or more suggestions for one of the data objects, wherein the providing of the one or more suggestions further comprises:

determining whether a received one of the data objects maps to one of multiple data types; and performing a conditional type inference to provide the one or more suggestions based on a result of the determining of whether the one of the data object maps to one of the multiple data types.

Aspect 12. The method of Aspect 11, wherein the providing of the one or more suggestions further comprises performing the conditional type inference to provide one of the multiple data types as a data type suggestion.

Aspect 13. The method of Aspect 11 or 12, wherein the providing of the one or more suggestions further comprises performing the conditional type inference to provide an indication of an error.

Aspect 14. The method of any of Aspects 11-13, further comprising generating a user interface comprising one or more components for one or more entities in an entity component system (ECS), wherein the one or more data objects represent the one or more components to be generated for the user interface.

Aspect 15. The method of Aspect 14, wherein the providing of the one or more suggestions further comprises populating one or more members of the mapped one of the multiple data types for one or more property fields of one of the components.

Aspect 16. The method of Aspect 15, further comprising determining the one or more property fields for the user interface corresponding to the one or more members.

Aspect 17. The method of any of Aspects 11-16, wherein the multiple data types comprise one or more customized data types.

Aspect 18. The method of any of Aspects 11-17, wherein the multiple data types comprise one or more existing data types.

Aspect 19. The method of any of Aspects 11-18, wherein the performing of the conditional type inference further comprises determining whether the one or more data objects includes an input key for the mapping to the multiple data types.

Aspect 20. A non-transitory computer-readable medium having computer-executable instructions stored thereon that, upon execution, cause one or more processors to perform operations comprising:

receiving one or more data objects; and providing one or more suggestions for one of the data objects, wherein the providing of the one or more suggestions further comprises:

determining whether a received one of the data objects maps to one of multiple data types; and performing a conditional type inference to provide the one or more suggestions based on a result of the determining of whether the one of the data object maps to one of the multiple data types.

Aspect 21. A system for controlling data schema for one or more data objects for generation of a user interface comprising one or more components for one or more entities in an entity component system (ECS), the system comprising:

a memory to receive and store one or more data objects; and a processor to provide one or more suggestions, wherein the processor is to:

determine whether one of the data objects maps to one of multiple data types; and perform a conditional type inference to provide the one or more suggestions based on a result of the determining of whether the one of the data object maps to one of the multiple data types.

Aspect 22. A method for controlling data schema for one or more data objects for generation of a user interface comprising one or more components for one or more entities in an entity component system (ECS), the method comprising:

receiving one or more data objects; and providing one or more suggestions for one of the data objects, wherein the providing of the one or more suggestions further comprises:

determining whether a received one of the data objects maps to one of multiple data types; and performing a conditional type inference to provide the one or more suggestions based on a result of the determining of whether the one of the data object maps to one of the multiple data types.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A system for controlling data schema for one or more data objects in a data oriented architecture, the system comprising:

a memory to receive and store one or more data objects; and a processor to provide one or more suggestions, wherein the processor is to:

determine whether one of the one or more data objects maps to one of multiple data types;

perform a conditional type inference to provide the one or more suggestions based on a result of determining whether the one of the one or more data objects maps to the one of the multiple data types; and generate a user interface comprising one or more components for one or more entities in an entity component system (ECS), wherein the one or more data objects represent the one or more components to be generated for the user interface.

2. The system of claim 1, wherein the processor is to perform the conditional type inference to provide a mapped one of the multiple data types as a data type suggestion.

3. The system of claim 1, wherein the processor is to perform the conditional type inference to provide an indication of an error.

4. The system of claim 1, wherein to provide the one or more suggestions further comprises to populate one or more members of a mapped one of the multiple data types for one or more property fields of one of the components.

5. The system of claim 4, wherein the processor is to further determine the one or more property fields for the user interface corresponding to the one or more members.

6. The system of claim 1, wherein the multiple data types comprise one or more customized data types.

7. The system of claim 1, wherein the multiple data types comprise one or more existing data types.

8. The system of claim 1, wherein the processor is to further determine whether the one or more data objects includes an input key for a mapping to the multiple data types.

9. The system of claim 1, wherein the processor is to further display, via an editor interface, the one or more suggestions.

10. A method for controlling data schema for one or more data objects in a data oriented architecture, the method comprising:

receiving one or more data objects; and providing one or more suggestions for one of the data objects, wherein the providing of the one or more suggestions further comprises:

determining whether a received one of the one or more data objects maps to one of multiple data types;

performing a conditional type inference to provide the one or more suggestions based on a result of the determining whether the received one of the one or more data objects maps to the one of the multiple data types; and generating a user interface comprising one or more components for one or more entities in an entity component system (ECS), wherein the one or more data objects represent the one or more components to be generated for the user interface.

11. The method of claim 10, wherein the providing of the one or more suggestions further comprises performing the conditional type inference to provide one of the multiple data types as a data type suggestion.

12. The method of claim 10, wherein the providing of the one or more suggestions further comprises performing the conditional type inference to provide an indication of an error.

13. The method of claim 10, wherein the providing of the one or more suggestions further comprises populating one or more members of a mapped one of the multiple data types for one or more property fields of one of the components.

14. The method of claim 13, further comprising determining the one or more property fields for the user interface corresponding to the one or more members.

15. The method of claim 10, wherein the multiple data types comprise one or more customized data types.

16. The method of claim 10, wherein the multiple data types comprise one or more existing data types.

17. The method of claim 10, wherein the performing of the conditional type inference further comprises determining whether the one or more data objects includes an input key for a mapping to the multiple data types.

18. A non-transitory computer-readable medium having computer-executable instructions stored thereon that, upon execution, cause one or more processors to perform operations comprising:

receiving one or more data objects; and providing one or more suggestions for one of the data objects, wherein the providing of the one or more suggestions further comprises:

determining whether a received one of the one or more data objects maps to one of multiple data types;

performing a conditional type inference to provide the one or more suggestions based on a result of the determining whether the received one of the one or more data objects maps to the one of the multiple data types; and generating a user interface comprising one or more components for one or more entities in an entity component system (ECS), wherein the one or more data objects represent the one or more components to be generated for the user interface.

* * * * *